(12) United States Patent
de Ruijter (10) Patent No.: US 12,200,761 B2
(45) Date of Patent: Jan. 14, 2025

(54) TRANSCEIVER WITH MULTI-CHANNEL CLEAR CHANNEL ASSESSMENT

(71) Applicant: Silicon Laboratories Inc., Austin, TX (US)

(72) Inventor: Hendricus de Ruijter, Roseville, CA (US)

(73) Assignee: Silicon Laboratories Inc., Austin, TX (US)

( * ) Notice: Subject to any disclaimer, the term of this patent is extended or adjusted under 35 U.S.C. 154(b) by 531 days.

(21) Appl. No.: 17/532,343

(22) Filed: Nov. 22, 2021

(65) Prior Publication Data
US 2023/0164830 A1    May 25, 2023

(51) Int. Cl.
*H04W 74/0808* (2024.01)
(52) U.S. Cl.
CPC ............................... *H04W 74/0808* (2013.01)
(58) Field of Classification Search
None
See application file for complete search history.

(56) References Cited

U.S. PATENT DOCUMENTS

| | | | | |
|---|---|---|---|---|
| 9,854,607 B1 * | 12/2017 | Chu | ..................... | H04W 74/002 |
| 2015/0131435 A1 * | 5/2015 | Kasslin | .................. | H04W 48/16 |
| | | | | 370/230 |
| 2016/0021661 A1 * | 1/2016 | Yerramalli | ........... | H04B 17/309 |
| | | | | 370/329 |
| 2016/0309335 A1 * | 10/2016 | Pao | ........................ | H04W 16/14 |
| 2017/0063574 A1 * | 3/2017 | Jalloul | ................... | H04L 25/021 |
| 2017/0265195 A1 * | 9/2017 | Naghshvar | ............ | H04W 72/52 |
| 2018/0103408 A1 * | 4/2018 | Amini | ................... | H04B 17/318 |
| 2018/0199375 A1 * | 7/2018 | Nezou | ............... | H04W 74/0816 |
| 2019/0159242 A1 * | 5/2019 | Vajapeyam | ........... | H04L 1/1861 |
| 2019/0254072 A1 * | 8/2019 | Baron | ............... | H04W 74/0816 |
| 2019/0313432 A1 * | 10/2019 | Belghoul | ............... | H04W 76/15 |
| 2019/0342919 A1 * | 11/2019 | Ahn | ........................ | H04W 28/26 |
| 2019/0380064 A1 * | 12/2019 | Salem | ............... | H04W 74/0808 |
| 2020/0178299 A1 * | 6/2020 | Yang | .................. | H04W 74/0808 |
| 2020/0266918 A1 * | 8/2020 | Lee | ......................... | H04L 1/1614 |
| 2021/0135692 A1 | 5/2021 | de Ruijter et al. | | |
| 2022/0345265 A1 * | 10/2022 | Horn | .................... | H04B 17/336 |
| 2024/0155673 A1 * | 5/2024 | Patil | .................. | H04W 74/0808 |

* cited by examiner

*Primary Examiner* — Kodzovi Acolatse
(74) *Attorney, Agent, or Firm* — Nields, Lemack & Frame, LLC (57) ABSTRACT

A wireless network device configured to monitor multiple channels for clear channel assessment (CCA) is disclosed. The receiver circuit of the network device comprises at least one CCA block, which is used to indicated whether a particular channel is clear. In certain embodiments, the network device checks each channel sequentially, and if both channels are free, transmits at least one packet. The at least one packet may include a MODE SWITCH packet and a second packet sent using the new PHY mode. The network device may also have multiple CCA blocks. In this scenario, the channels may be checked concurrently, and if both channels are free, the network device transmits at least one packet. Alternatively, the network device monitors multiple channels concurrently and selected one of the channels on which to transmit a preferred PHY mode, thereby avoiding the need for a MODE SWITCH packet.

17 Claims, 8 Drawing Sheets

TRANSCEIVER WITH MULTI-CHANNEL CLEAR CHANNEL ASSESSMENT

FIELD

This disclosure describes systems and methods for transmitting packets over a shared medium that uses multiple frequency channels.

BACKGROUND

Various wireless network protocols support multiple channels and in addition they may also support more than one PHY mode. For example, a PHY mode could be different when the same modulation type is used, such as frequency shift keying (FSK), but the data rate is different or the encoding scheme could be different. A PHY mode could also be different when a different modulation type is used, for example FSK and Orthogonal Frequency Division Multiplexing (OFDM), where the data rate between the two different PHY modes could be different or the same. With multiple channels and PHY modes used in a single network, Clear Channel Assessment (CCA) becomes more complicated. Multiple PHY modes may require different channel center frequencies and different channel bandwidths. For example, certain network protocols, such as IEEE 802.15.4-2020 and WiSUN FAN 1.1, specify a Mode Switch Scheme, where the transmitter may transmit a first packet, referred to as a MODE SWITCH packet, which informs the receiver that the next packet will be transmitted using a different PHY mode.

With traditional CCA, there is a possibility that a MODE SWITCH packet is transmitted without a subsequent NEW PHY MODE packet. This would waste energy on both sides of the link. Apart from the energy waste, it would also negatively impact network capacity, latency and throughput.

In a conventional CCA scheme, a first CCA needs to succeed before the transmission of the MODE SWITCH packet and a second CCA needs to succeed before the transmission of the NEW PHY MODE packet. In WiSUN, the channel for the MODE SWITCH packet, using the base PHY, can be different compared to the channel for the NEW PHY MODE packet which is using the new PHY mode. In other words, they may have different center frequencies and/or have different bandwidths. The channels could completely or partially overlap or they could be completely separated without overlap. A conventional CCA would be performed with the channel filter center frequency and bandwidth tuned to the channel that it intends to transmit. In the WiSUN Mode Switching Scheme, the channel filter may need to be tuned differently before the CCA for the NEW PHY MODE packet. This may result in filtering out an interferer during the first CCA, while that same interferer could fall in the pass band of the channel filter during the second CCA. This may cause the first CCA to succeed, allowing the transmission of the MODE SWITCH packet and to cause the second CCA to fail, meaning that the channel assigned to the NEW PHY MODE is occupied and the NEW PHY MODE packet cannot be transmitted. In this scenario, the energy used for transmission of the MODE SWITCH packet can be considered wasted as there is no data payload in the MODE SWITCH packet. Also, in this scenario, the on-air time by transmitting the MODE SWITCH packet may cause other nodes to postpone their transmission causing a reduction in network traffic capacity, increase latency and reduce throughput.

Yet an additional problem is that all of the nodes that received the MODE SWITCH packet may be unreachable for some time because each may have switched its receiver to the New PHY mode. Other nodes are likely not aware of this and may attempt transmissions using the base PHY, which may not be received as the receiving node may have its receiver configured for the new PHY mode. This will further reduce the network traffic capacity, increase latency and reduce throughput.

Therefore, it would be beneficial if there was a transceiver that more efficiently handles multiple channels and PHY modes. Further, it would be advantageous if this transceiver was able to efficiently switch between these different PHY modes.

In addition, it would be beneficial to avoid the need for the MODE SWITCH packet. The drawbacks of the MODE SWITCH packet are caused by a lack of encryption and addressing. The MODE SWITCH packet does not have encryption and hence is vulnerable to attacks from malicious sources. For example, by transmitting malicious MODE SWITCH packets, receiving nodes may switch their PHY modes and become unusable for the network. Also, the MODE SWITCH packet does not have any addressing so any receiving node may act on it.

SUMMARY

A wireless network device configured to monitor multiple channels for clear channel assessment (CCA) is disclosed. The receiver circuit of the network device comprises at least one CCA block, which is used to indicate whether a particular channel is clear. In certain embodiments, the network device checks each channel sequentially, and if both channels are free, transmits at least one packet. The at least one packet may include a MODE SWITCH packet and a second packet sent using the new PHY mode. The network device may also have multiple CCA blocks. In this scenario, the channels may be checked concurrently, and if both channels are free, the network device transmits at least one packet. Alternatively, the network device monitors multiple channels concurrently and selected one of the channels on which to transmit a preferred PHY mode, thereby avoiding the need for a MODE SWITCH packet. The selection of the preferred PHY mode may be based on data rate, link budget, range, noise level, channel characteristics, or other metrics.

According to one embodiment, a network device for transmitting packets using a plurality of channels is disclosed. The network device comprises a transceiver comprising: a receiver circuit comprising at least one Clear Channel Assessment (CCA) block to determine whether a channel is clear; a transmit circuit adapted to transmit packets on any of the plurality of channels; and a channel access controller, wherein the channel access controller controls the receiver circuit to perform clear channel tests of at least two of the plurality of channels during a first time period, and controls the transmit circuit to transmit at least one packet on a clear channel during a second time period, after the first time period. In some embodiments, the clear channel tests are performed sequentially during the first time period and the network device transmits at least two packets during the second time period using two different clear channels. In certain embodiments, a first packet comprises a MODE SWITCH packet sent using a first PHY mode and a second packet comprises a packet using a second PHY mode. In some embodiments, the CCA block comprises a channel filter having a programmable frequency and bandwidth, and the channel access controller configures the channel filter such that the bandwidth of the channel filter encompasses a combined frequency range of the at least two of the plurality of channels. In certain embodiments, the receiver circuit comprises a channel filter having a programmable frequency and bandwidth, and the channel access controller configures the channel filter for a first channel, waits for completion of a first clear channel test, configures the channel filter for a second channel and waits for completion of a second clear channel test before transmitting the at least one packet. In some embodiments, each failed clear channel test is followed by an adjustment in back-off delay and a retry, wherein the back-off delay represents time between a completion of a failed clear channel test and a start of a clear channel test retry. In certain embodiments, the receiver circuit comprises a channel filter having a programmable bandwidth and a local oscillator, and the channel access controller configures the bandwidth of the channel filter and the local oscillator to tune a receive frequency to a first channel, waits for completion of a first clear channel test, configures the bandwidth of the channel filter and the local oscillator to tune the receive frequency to a second channel and waits for completion of a second clear channel test before transmitting the at least one packet on the clear channel. In some embodiments, each of the plurality of channels utilizes a different PHY mode.

According to another embodiment, a network device for transmitting packets using a plurality of channels is disclosed. The network device comprises a transceiver comprising: a receiver circuit comprising a plurality of Clear Channel Assessment (CCA) blocks, configured to operate concurrently; a transmit circuit, adapted to transmit packets on any of the plurality of different channels; and a channel access controller, wherein the channel access controller controls the receiver circuit to perform clear channel assessments on at least two of the plurality of different channels during a first time period, and controls the transmit circuit to transmit at least one packet on a clear channel during a second time period, after the first time period. In some embodiments, the network device transmits at least two packets during the second time period, wherein the two packets are transmitted using the two different channels. In certain embodiments, a first packet comprises a MODE SWITCH packet sent using a first PHY mode and a second packet comprises a packet using a second PHY mode. In some embodiments, each CCA block comprises a channel filter having a programmable frequency and bandwidth, and the channel access controller configures the plurality of channel filters before performing the clear channel assessments. In some embodiments, each CCA block comprises a channel filter having a programmable frequency and bandwidth, and the channel access controller processes the CCA blocks concurrently such that the channel access controller configures a first channel filter for a first channel, configures a second channel filter for a second channel, enables the receiver circuit and waits for a clear channel assessment for both channels to complete before transmitting the at least one packet. In some embodiments, each of the plurality of different channels utilizes a different PHY mode.

According to another embodiment, a network device for transmitting packets using two different channels is disclosed. The network device comprises a transceiver comprising: a receiver circuit comprising a at least one Clear Channel Assessment (CCA) blocks, configured to determine whether a channel is clear; a transmit circuit adapted to transmit packets on either a base channel using a base PHY or a preferred channel using a preferred PHY; and a channel access controller, wherein the channel access controller controls the receiver circuit to perform a first clear channel test on the preferred channel and optionally a second clear channel test on the base channel, wherein the channel access controller configures the transmit circuit to transmit the preferred PHY when the first clear channel test succeeded or configures the transmit circuit to transmit the base PHY if the first clear channel test failed and the second clear channel test succeeded. In some embodiments, the preferred channel is a clear channel having a highest data rate. In certain embodiments, the clear channel tests are performed sequentially and the second clear channel test is only performed if the first clear channel test failed. In some embodiments, the network device comprises a second Clear Channel Assessment block, wherein the first clear channel test and the second clear channel test are performed concurrently. In certain embodiments, the two different channels comprise two different PHY modes. In some embodiments, the preferred channel is a channel having a lowest energy.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
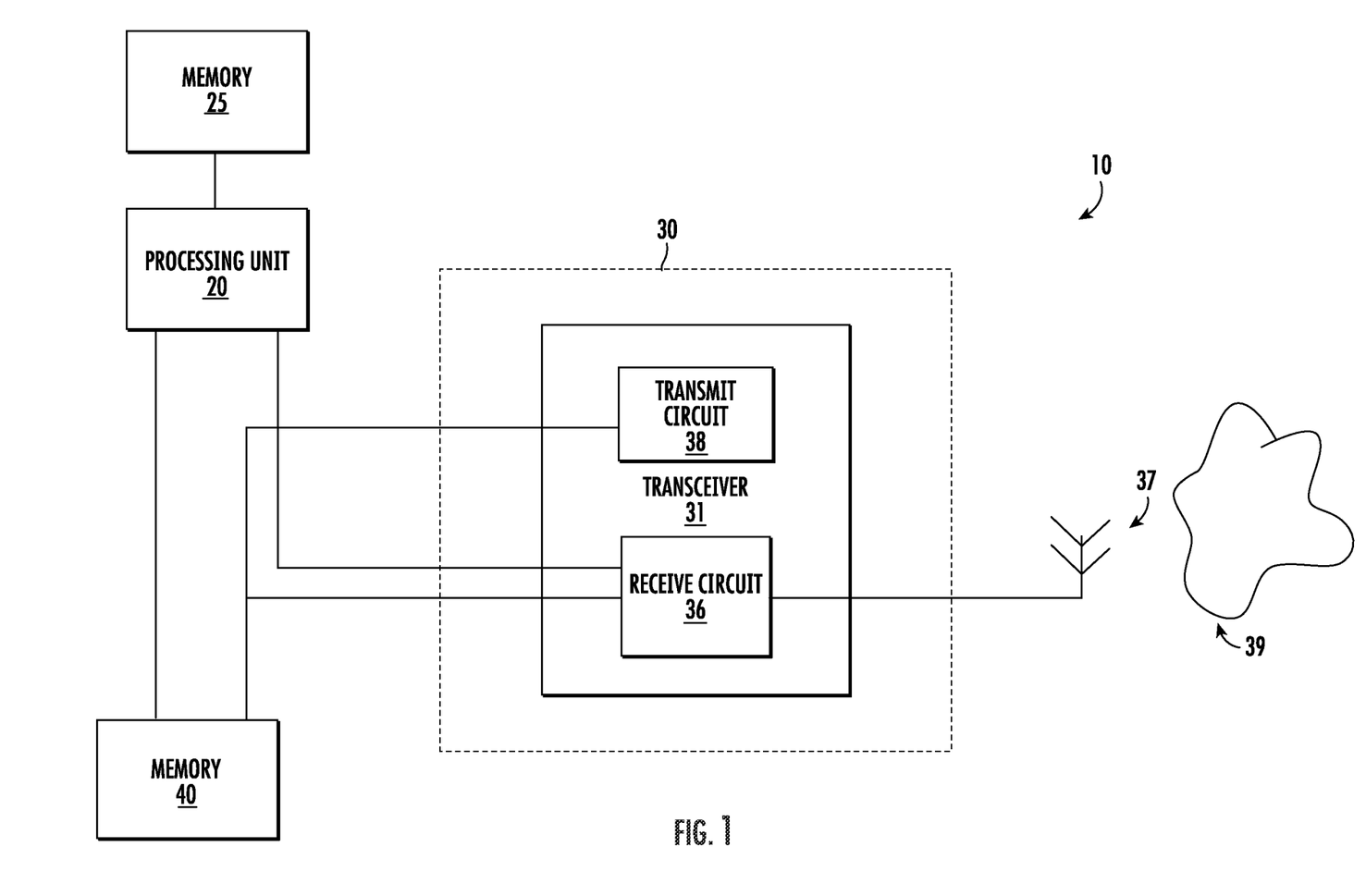
FIG. 1 is a block diagram of a network device that may include the transceiver described herein.

FIG. 1 shows a network device that may be include the transceiver described herein. The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna 37. The network interface 30 may support any wireless network protocol that supports range detection, such as Bluetooth. The network interface 30 is used to allow the network device 10 to communicate with other devices disposed on the network 39.

The network interface 30 includes a transceiver 31. This transceiver 31 is used to process the incoming signal and convert the wireless signals to digital signals. The transceiver 31 is also used to transmit outgoing signals. The components within the transceiver 31 are described in more detail below.

The transceiver 31 includes a receive circuit 36. The receive circuit 36 is used to receive, synchronize and decode the digital signals received from the antenna 37. Specifically, the receive circuit 36 has a preamble detector that is used to identify the start of an incoming packet. The receive circuit 36 also has a sync detector, which is used to identify a particular sequence of bits that are referred to as a sync character. Additionally, the receive circuit 36 has a decoder which is used to convert the digital signals into properly aligned bytes of data.

The network interface 30 also includes a transmit circuit 38. The transmit circuit 38 may include a power amplifier that is used to supply a signal to be transmitted to the antenna 37.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

Figure 2:
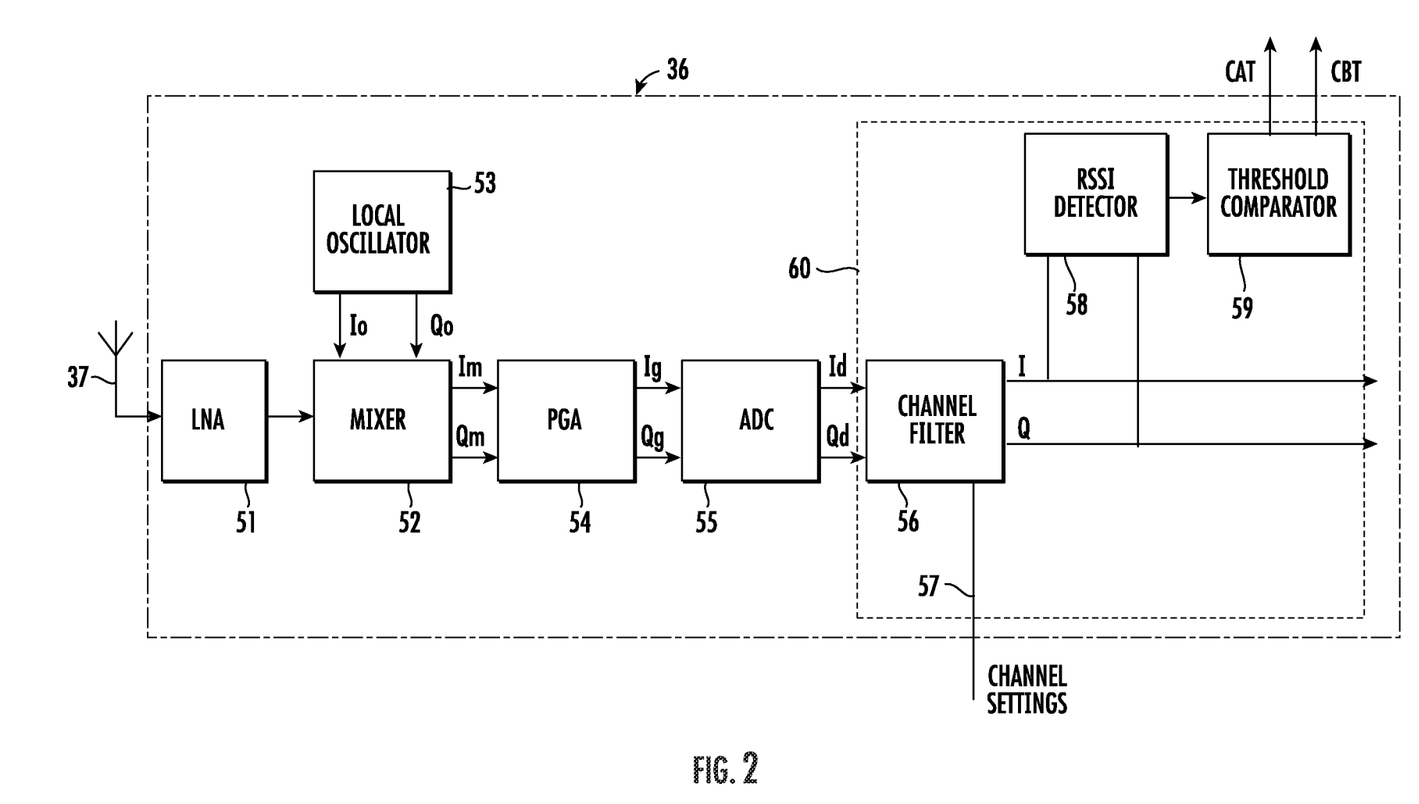
FIG. 2 is a block diagram of the radio receiver of the network device of FIG. 1.

FIG. 2 shows a block diagram of the receive circuit 36. The wireless signals first enter the transceiver 31 through the antenna 37. This antenna 37 is in electrical communication with a low noise amplifier (LNA) 51. The LNA 51 receives a very weak signal from the antenna 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sine of the frequency may be referred to as $Q_o$, together called the complex $I_o/Q_o$ signal. Using the mixer 52, the complex $I_o/Q_o$ signal is then multiplied by the incoming signal to create the complex $I_m/Q_m$ signal. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 then exit the transceiver 31 as I and Q. The channel filter 56 is programmable for a particular frequency and bandwidth. For example, the channel filter 56 may have an input that provides the channel settings 57, such as center frequency and bandwidth, to be used. In certain embodiments, the channel filter 56 may comprise a complex digital mixer, a complex digital oscillator and two digital lowpass filters. The complex digital mixer provides complex multiplication by multiplying the complex $I_d$ and Qd signals with the complex signals from the complex digital oscillator. The complex output of the digital mixer is fed to the input of a digital lowpass filters, where one digital lowpass filter is used for the inphase channel and the other is used for the quadrature channel. The outputs of the digital filters may provide the I and Q outputs of the channel filter 56. This allows for configuring the center frequency by setting the frequency of the complex digital oscillator and the bandwidth by configuring the digital lowpass filters. Decimation filters, DC cancelation circuits, IQ calibration circuits, and other circuits may all be part of the channel filter 56, as those of ordinary skill in the art will recognize. Alternatively, the center frequency may be changed by configuring the Local Oscillator 53 to tune the receiver to the desired channel.

The I and Q signals then enter a Radio Signal Strength Indicator (RSSI) detector 58, which is used to measure the energy in the received signal. In certain embodiments, the RSSI detector 58 comprises a magnitude detector, which determines the magnitude of the incoming signals as $\sqrt{I^2+Q^2}$. In certain embodiments, this magnitude detector may be incorporated in a CORDIC, which may be dedicated to the RSSI detector 58. Alternatively, the CORDIC may be used for other functions as well, such as determining phase which may be used by other components in the transceiver 31.

This magnitude may then be the input to a log converter, which converts the magnitude from the linear domain to a logarithmic domain. The output of the log converter may then serve as an input to a filter, which may be used to average the information. Alternatively, the filter may be placed before the log converter to filter the magnitude signal in the linear domain. The output from the RSSI detector 58 is then provided to a threshold comparator 59. If the energy detected by the RSSI detector 58 is less than a predetermined threshold, the threshold comparator 59 outputs a signal that indicates that the channel is clear, referred to as channel below threshold or CBT. If the energy detected by the RSSI detector 58 is greater than a predetermined threshold, the threshold comparator 59 outputs a signal that indicates that the channel is busy, referred to as channel above threshold or CAT. Note that the described RSSI detection is also known as energy detection or "energy above threshold".

The channel filter 56, the RSSI detector 58 and the threshold comparator 59 may together be considered to be the CCA block 60. Based on the inputs supplied to the channel filter 56, the CCA block 60 provides a channel clear signal for a specific frequency band. In other words, the term "channel" refers to a specific range of frequencies. Note that multiple CCA blocks may be incorporated in the receive circuit 36 so that multiple frequency bands may be monitored simultaneously.

Instead of using RSSI for CCA, those skilled in the art would recognize that other characteristics may be used as well. For example, Carrier Sense may be used, as is published in the IEEE 802.15.4-2020 standard. Using Carrier Sense, CCA shall report a busy medium upon detection of a signal with the same modulation and spreading characteristics of the PHY that is intended for that channel. Alternatively, Carrier Sense could be combined with RSSI detection, such as by applying OR or AND functions to the outputs of the RSSI detector and the Carrier Sense detector.

Having described the architecture of the network device 10, its operation when used in a multi-PHY network will be described. In certain network protocols, such as the WiSUN Field Area Network (FAN) protocol, the transmitting node sends a receiving node a first packet, referred to as a MODE SWITCH packet, informing the receiving node that the next packet will be sent using a different PHY mode. The transmitting node then sends a second packet, referred to as the NEW PHY MODE packet.

A PHY mode is a set of parameters that define the characteristics of a packet. These parameters may include modulation type, encoding scheme, bit rate, data rate, baud rate and other parameters.

The processing of the CCA completes when it produces either a clear channel indication, also referred to as CCA succeed, or a busy channel indication, also referred to as CCA fail. Using a conventional CCA scheme, the following steps are typically performed when mode switching is used, such as per WiSUN FAN 1.1. First, a network device 10, which is referred to the transmitting node, must set the channel settings 57 so as to correspond to the frequency and bandwidth associated with the first PHY mode that is intended for transmission on that channel. This may be the PHY mode used for the MODE SWITCH packet. Once the channel filter is configured, the receiver will be enabled. A backoff time may be included before the start of CCA but typically the backoff time is zero before the first CCA attempt and gradually increases when CCA retries accumulate. Once CCA commences, the receiver on-time is long enough to settle the RSSI value. After some time, the CCA completes by checking the output of the threshold comparator 59 in CCA block 60. The CCA block 60 may return a channel clear indication (CBT), at which time, the transmitting node may transmit the MODE SWITCH packet.

Once this MODE SWITCH packet has been transmitted, a similar CCA process as described for the MODE SWITCH packet is then performed prior to transmitting the NEW PHY MODE packet. The transmitting node must then set the channel settings 57 so as to correspond to the frequency and bandwidth associated with the second PHY mode, which corresponds to the NEW PHY MODE packet. After the CCA completes, the CCA block 60 may return a channel clear indication, at which time, the transmitting node may transmit the NEW PHY MODE packet.

As explained above, there are various issues associated with this approach. For example, after sending the MODE SWITCH packet, the transmitting node may not receive an indication of a clear channel for the second PHY mode within the predetermined time duration. Thus, the transmitting node will not send the NEW PHY MODE packet and will return to the first PHY mode. However, the receiving node may still be configured for the second PHY mode, and therefore cannot receive packets from the transmitting node until the receiving node returns to the MODE SWITCH PHY MODE, also known as the base PHY mode.

The present disclosure described several embodiments to overcome this shortcoming.

Figure 3:
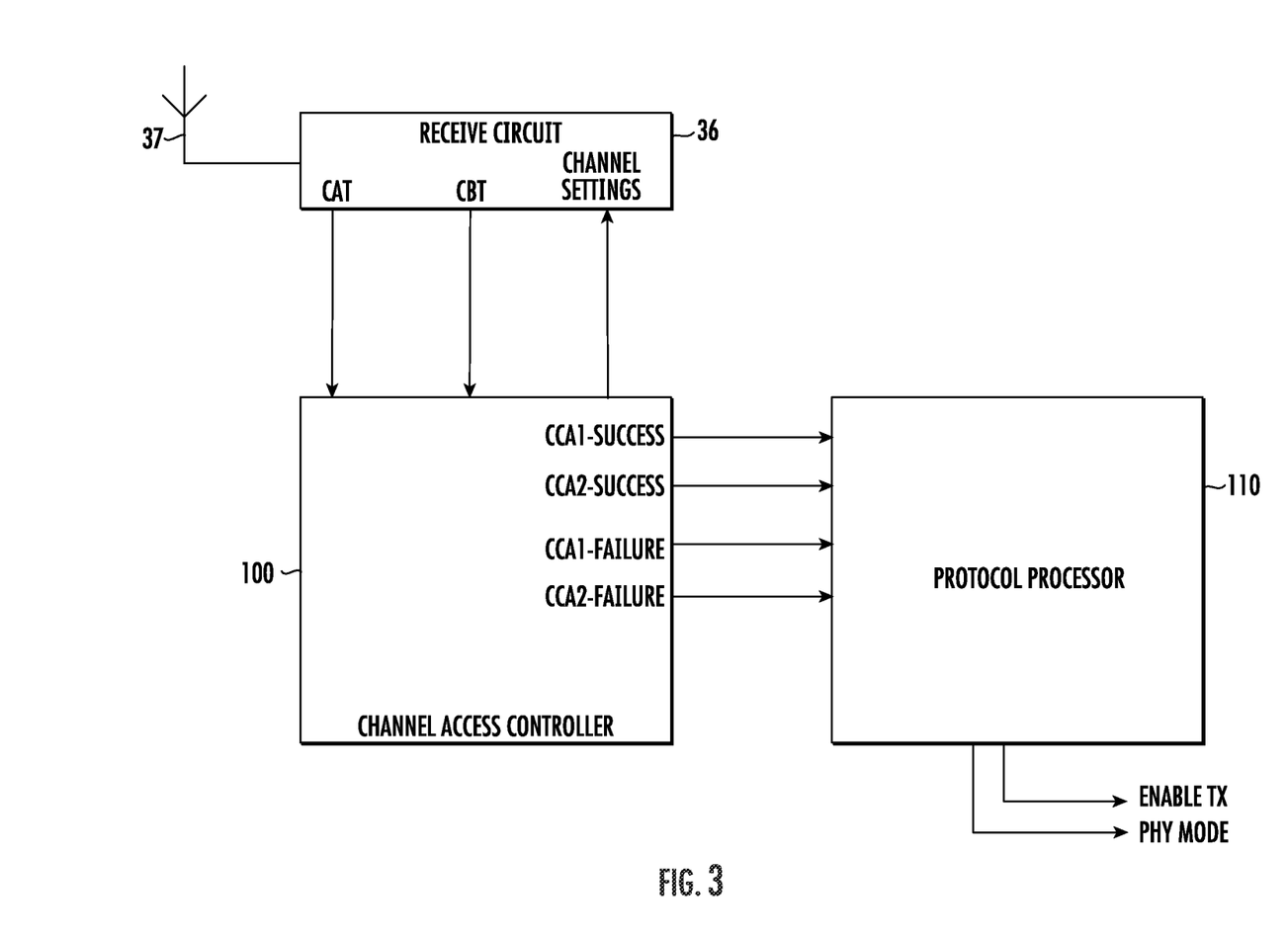
FIG. 3 shows a block diagram of a receiver circuit that supports CCA with multiple channels according to a first embodiment.

FIG. 3 shows a portion of a network device 10 that utilizes the receive circuit 36 of FIG. 2 to enable the transmit circuit 38. In this embodiment, the receive circuit 36 comprises only one CCA block 60. The network device 10 also includes a Channel Access Controller 100. In some embodiments, the Channel Access Controller 100 may be implemented in hardware. In other embodiments, the Channel Access Controller 100 may be implemented in software executing on processing unit 20.

The network device 10 also includes a protocol processor 110. In some embodiments, the protocol processor 110 may be implemented in hardware. In other embodiments, the protocol processor 110 may be implemented in software executing on processing unit 20.

The protocol processor 110 operates in conjunction with the Channel Access Controller 100 to configure the receive circuit 36 and enable the transmit circuit 38. In some embodiments, the Channel Access Controller 100 and the protocol processor 110 may share hardware or may be combined into a single hardware or software component. In other embodiments, the Channel Access Controller may be implemented as part of a receiver/transmitter controller, also referred to as the Radio Controller. A Radio controller is commonly used in many Wireless SoC products where it controls PHY settings, activates the receiver or transmitter and to support radio functions.

Figure 4:
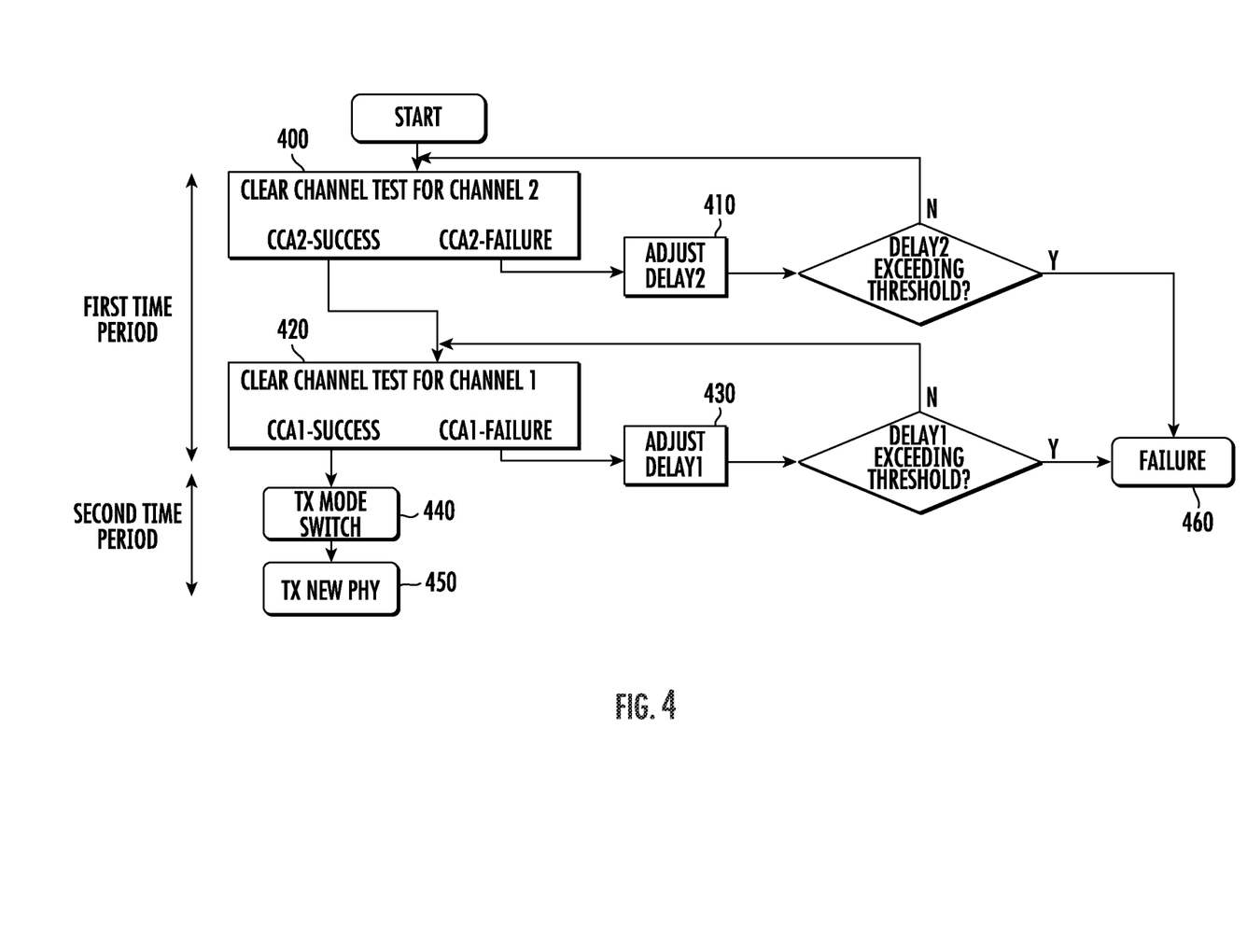
FIG. 4 shows a first sequence that may be utilized with the receiver circuit of FIG. 3.

FIG. 4 shows a sequence of operations, using the receive circuit 36 of FIG. 3 according to one embodiment. First, as shown in Box 400, a clear channel test for channel 2 is performed. In these figures, a clear channel test comprises the following steps. First, the receive circuit 36 waits a predetermined backoff delay time. Note that typically the backoff time is zero before the first CCA attempt and gradually increases when CCA retries accumulate. After this backoff delay time, the receive circuit 36 is enabled, with the channel settings configured for the desired PHY mode, and time is allowed for RSSI settling. Then the Channel Access Controller 100 checks the CAT and CBT outputs of receive circuit 36. If the energy is above a predetermined threshold, as indicated by CAT, an indication that the channel is busy is provided. This indication must be referred to as CCAx Failure. If the energy is below the predetermined threshold, as indicated by CBT, an indication that the channel is clear, referred to as CCAx Success, is provided. The sequence shown in FIG. 4 may be controlled by the Channel Access Controller 100 or the Protocol Processor 110 or a combination thereof.

To perform a clear channel test for channel 2, the Channel Access Controller 100 may provide channel settings 57 to the receive circuit 36 associated with the second PHY mode, which operates on the second channel.

The clear channel test for channel 2 either returns CCA2 Failure or CCA2 Success. If the clear channel test fails, the Channel Access Controller 100 adjusts the backoff delay time, as shown in Box 410. If the delay is less than a threshold value, the Channel Access Controller 100 performs another clear channel test for channel 2. If the number of retries has been exhausted, the Channel Access Controller 100 indicates that the operation has failed, as shown in Box 460.

If the clear channel test for channel 2 succeeds, the Channel Access Controller 100 performs a clear channel test for channel 1, as shown in Box 420. To perform a clear channel test for channel 1, the Channel Access Controller 100 may provide channel settings 57 to the receive circuit 36 associated with the first PHY mode, which operates on the first channel.

The clear channel test for channel 1 either returns CCA1 Failure or CCA1 Success. If the clear channel test fails, the Channel Access Controller 100 adjusts the backoff delay time, as shown in Box 430. If the delay is less than a threshold value, the Channel Access Controller 100 performs another clear channel test for channel 1. If the number of retries has been exhausted, the Channel Access Controller 100 indicates that the operation has failed, as shown in Box 460.

If the clear channel test for channel 1 succeeds, the protocol processor 110 indicates that the transmit circuit 38 may transmit the MODE SWITCH packet, as shown in Box 440. The protocol processor 110 may provide an enable signal to the transmit circuit 38, along with the PHY mode to be used, which is the first PHY mode.

Once the MODE SWITCH packet has been transmitted, the protocol processor 110 may provide an enable signal to the transmit circuit 38, along with the PHY mode to be used, which is the second PHY mode. The NEW PHY MODE packet may now be transmitted, as shown in Box 450.

By performing the two CCA tests during a first time period, and the transmissions during a second time period, where the second time period commences after the first period time, this embodiment ensures that both channels are clear prior to transmitting either packet. This may reduce the possibility that the MODE SWITCH packet is delivered, but the NEW PHY MODE packet is not delivered, thereby saving bandwidth and power.

Further, in certain embodiments, the sequence may be switched such that the clear channel test is performed for channel 1 first.

Figure 5A:
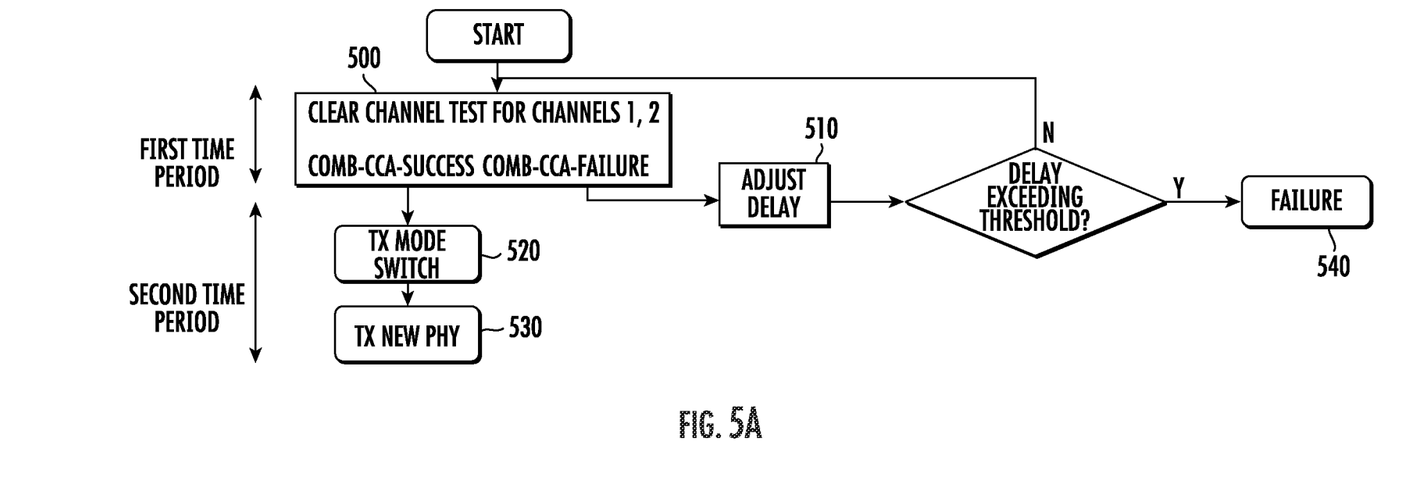
FIG. 5A shows a second sequence that may be utilized with the receiver circuit of FIG. 3.
Figure 5B:
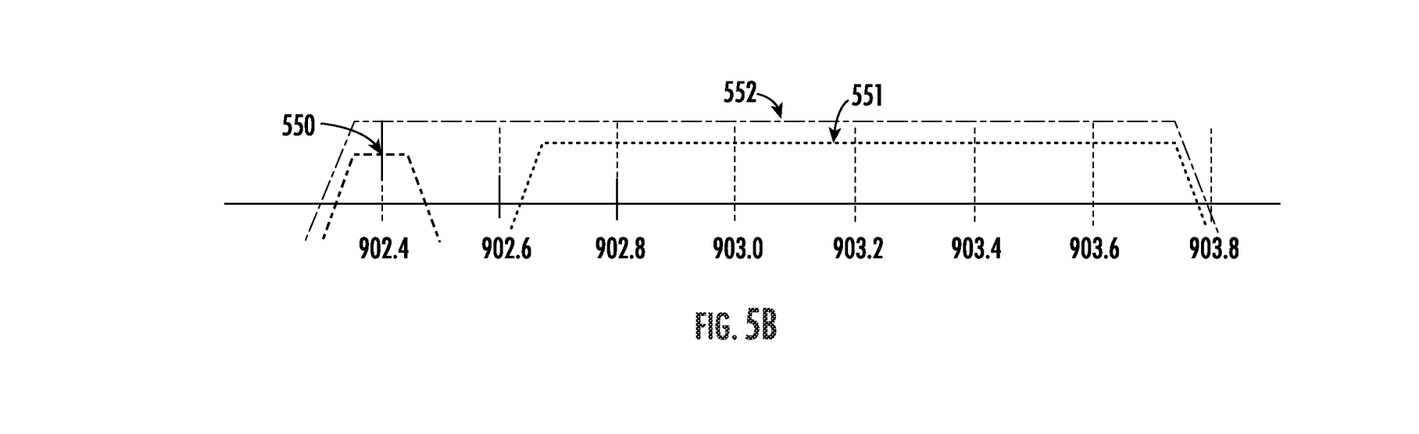
FIG. 5B shows the bandwidth of the channel filter used in FIG. 5A.

FIG. 5A shows a sequence of operations using the receive circuit 36 of FIG. 3 according to a second embodiment. In this embodiment, the channel filter 56 is designed such that its bandwidth may encompass both the first channel and the second channel. FIG. 5B shows the first frequency range 550 used by the first channel, and the second frequency range 551 used by the second channel. In this embodiment, the channel settings 57 are such that the bandwidth of the channel filter 56 creates a frequency range 552 that encompasses both the first channel and the second channel. In this way, if the clear channel test fails, it cannot be determined which channel was busy. However, if the clear channel test succeeds, both channels are assumed to be clear.

As shown in FIG. 5A, to perform a clear channel test for the combined channel, the Channel Access Controller 100 may provide channel settings 57 to the receive circuit 36 that encompass both the first channel and the second channel.

As shown in Box 500, the clear channel test for combined channel either returns COMB CCA Failure or COMB CCA Success. If the clear channel test fails, the Channel Access Controller 100 adjusts the backoff delay time, as shown in Box 510. If the delay is less than a threshold value, the Channel Access Controller 100 performs another clear channel test for the combined channel. If the number of retries has been exhausted, the Channel Access Controller 100 indicates that the operation has failed, as shown in Box 540.

If the clear channel test for the combined channel succeeds, the protocol processor 110 indicates that the transmit circuit 38 may transmit the MODE SWITCH packet, as shown in Box 520. The protocol processor 110 may provide an enable signal to the transmit circuit 38, along with the PHY mode to be used, which is the first PHY mode.

Once the MODE SWITCH packet has been transmitted, the protocol processor 110 may provide an enable signal to the transmit circuit 38, along with the PHY mode to be used, which is the second PHY mode. The NEW PHY MODE packet may now be transmitted, as shown in Box 530. The sequence shown in FIG. 5A may be controlled by the Channel Access Controller 100 or the Protocol Processor 110 or a combination thereof.

Figure 6:
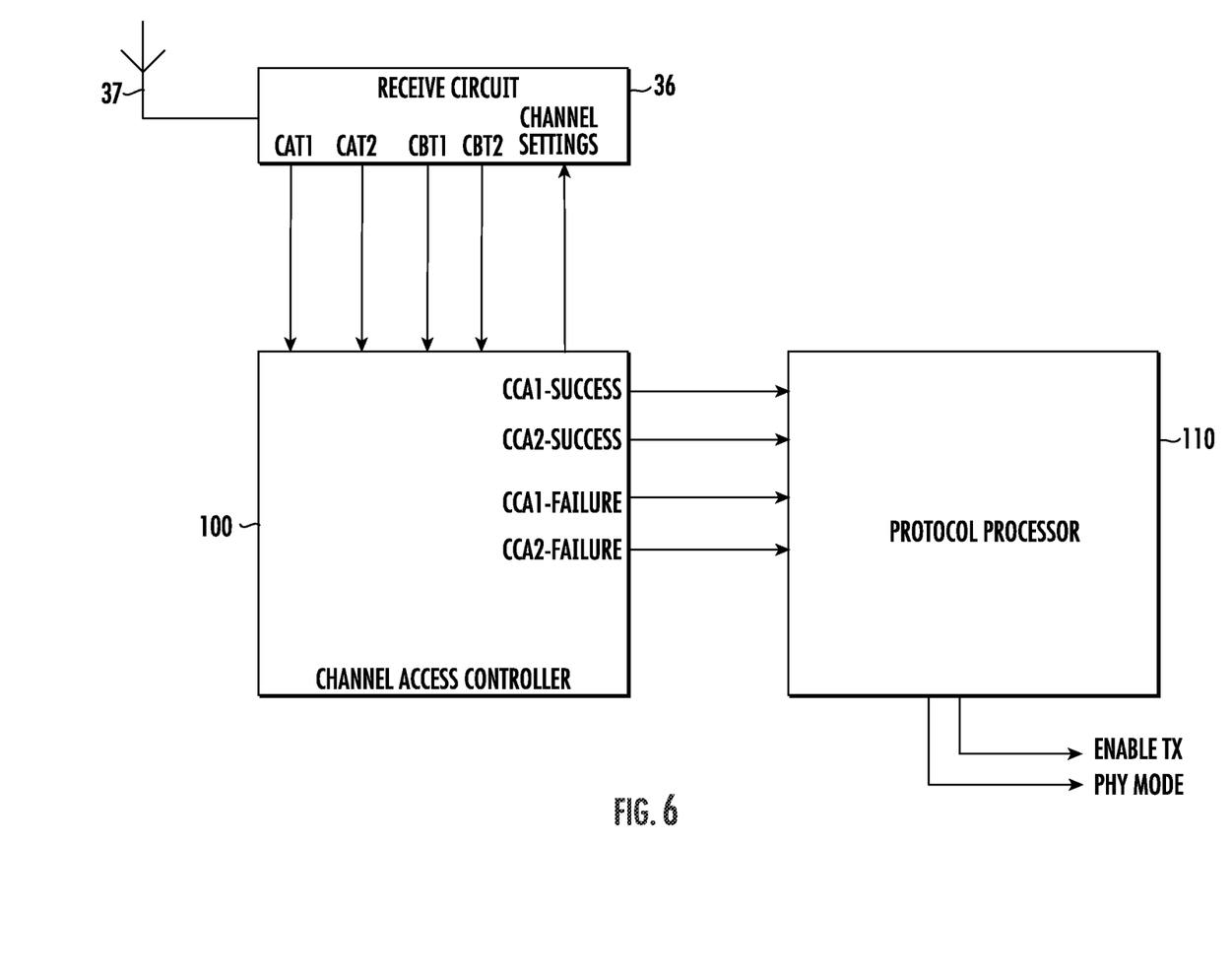
FIG. 6 shows a block diagram of a receiver circuit that supports CCA with multiple channels according to a second embodiment.

FIG. 6 shows a portion of a network device 10 that utilizes the receive circuit 36 of FIG. 2 to enable the transmit circuit 38. In this embodiment, the receive circuit 36 comprises two CCA blocks 60, where each CCA block 60 comprises a channel filter 56, RSSI detector 58 and threshold comparator 59. Each CCA block 60 may be independently configured using its own set of channel settings 57, and provides its own CAT and CBT outputs.

Thus, in one embodiment, the sequence shown in FIG. 4 may be performed using a receive circuit 36 with two CCA blocks 60. In other words, the Channel Access Controller 100 may choose to check each channel sequentially, as shown in FIG. 4.

Figure 7:
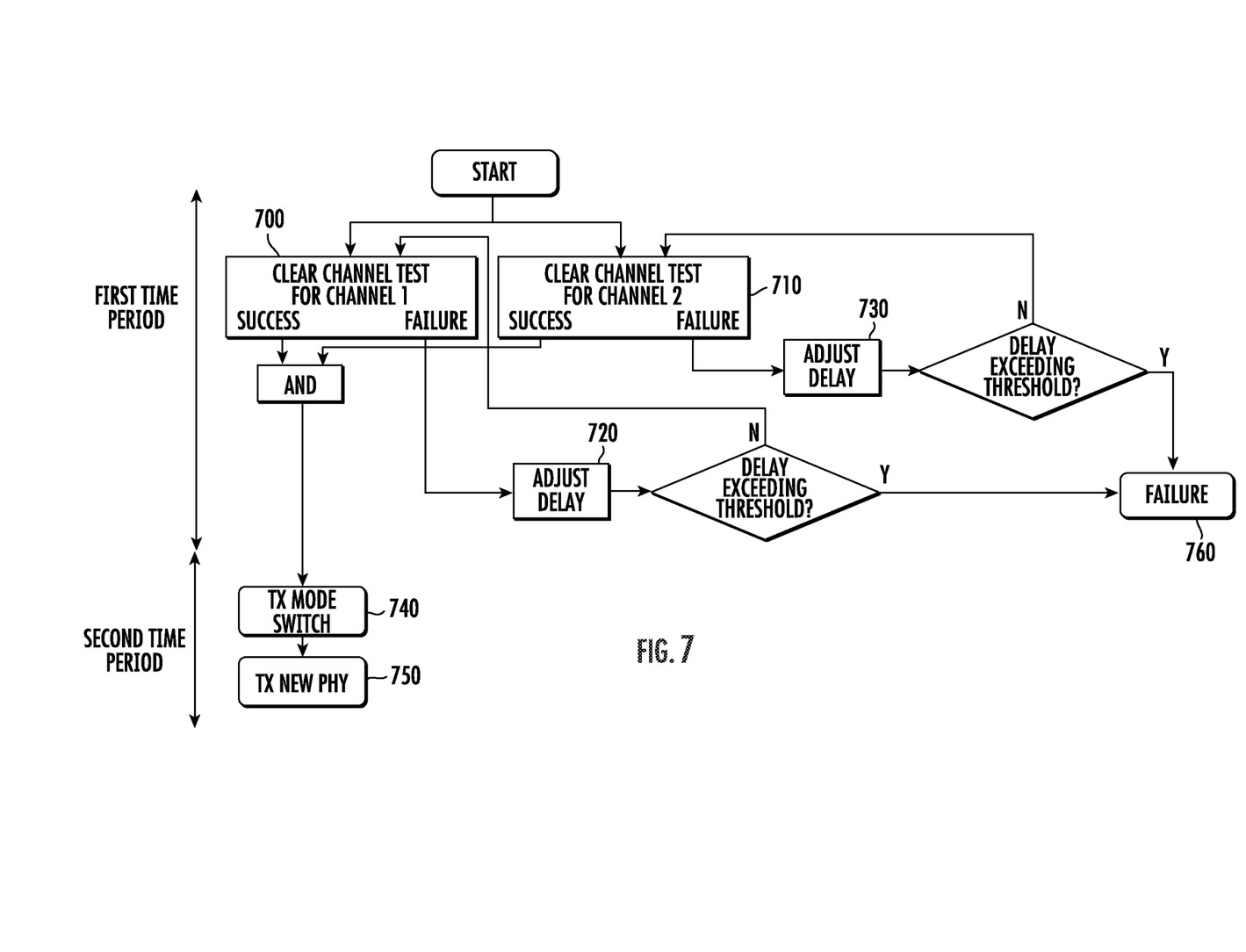
FIG. 7 shows a first sequence that may be utilized with the receiver circuit of FIG. 6.

However, the sequence shown in FIG. 4 may be optimized by performing the two clear channel tests simultaneously. The receiver on-time, and hence the power consumption, can be reduced by processing two clear channel tests simultaneously. An additional benefit is a reduced latency between the clear channel tests and the subsequent transmission. This embodiment is shown in FIG. 7. First, the Channel Access Controller 100 may configure the first and second CCA blocks with the channel setting 57 for the first channel and second channel, respectively.

As shown in Box 700, the clear channel test for channel 1 may commence. This may be at the same time as the clear channel test for channel 2, as shown in Box 710. As described above, the clear channel test for channel 1 either returns CCA1 Failure or CCA1 Success. If the clear channel test for channel 1 fails, the Channel Access Controller 100 adjusts the backoff delay time, as shown in Box 720. If the delay is less than a threshold value, the Channel Access Controller 100 performs another clear channel test for channel 1. If the number of retries has been exhausted, the Channel Access Controller 100 indicates that the operation has failed, as shown in Box 760.

Simultaneously, the clear channel test for channel 2 either returns CCA2 Failure or CCA2 Success. If the clear channel test for channel 2 fails, the Channel Access Controller 100 adjusts the backoff delay time, as shown in Box 730. If the delay is less than a threshold value, the Channel Access Controller 100 performs another clear channel test for channel 2. If the number of retries has been exhausted, the Channel Access Controller 100 indicates that the operation has failed, as shown in Box 760.

If the clear channel tests for both channel 1 and channel 2 succeed, the protocol processor 110 indicates that the transmit circuit 38 may transmit the MODE SWITCH packet, as shown in Box 740. The protocol processor 110 may provide an enable signal to the transmit circuit 38, along with the PHY mode to be used, which is the first PHY mode.

Once the MODE SWITCH packet has been transmitted, the protocol processor 110 may provide an enable signal to the transmit circuit 38, along with the PHY mode to be used, which is the second PHY mode. The NEW PHY MODE packet may now be transmitted, as shown in Box 750. The sequence shown in FIG. 7 may be controlled by the Channel Access Controller 100 or the Protocol Processor 110 or a combination thereof.

Thus, each of the embodiments shown in FIGS. 4, 5A and 7 illustrate a sequence wherein, during a first time period, the network device ensures that both the first channel and the second channel are clear. During the second time period, which follows the first time period, the network device transmits two packets, using different PHY modes. These two packets may be a MODE SWITCH packet, which informs the receiving node that the next packet will be transmitted using a different PHY mode; and a NEW PHY packet, which is transmitted using the second PHY mode.

Figure 8:
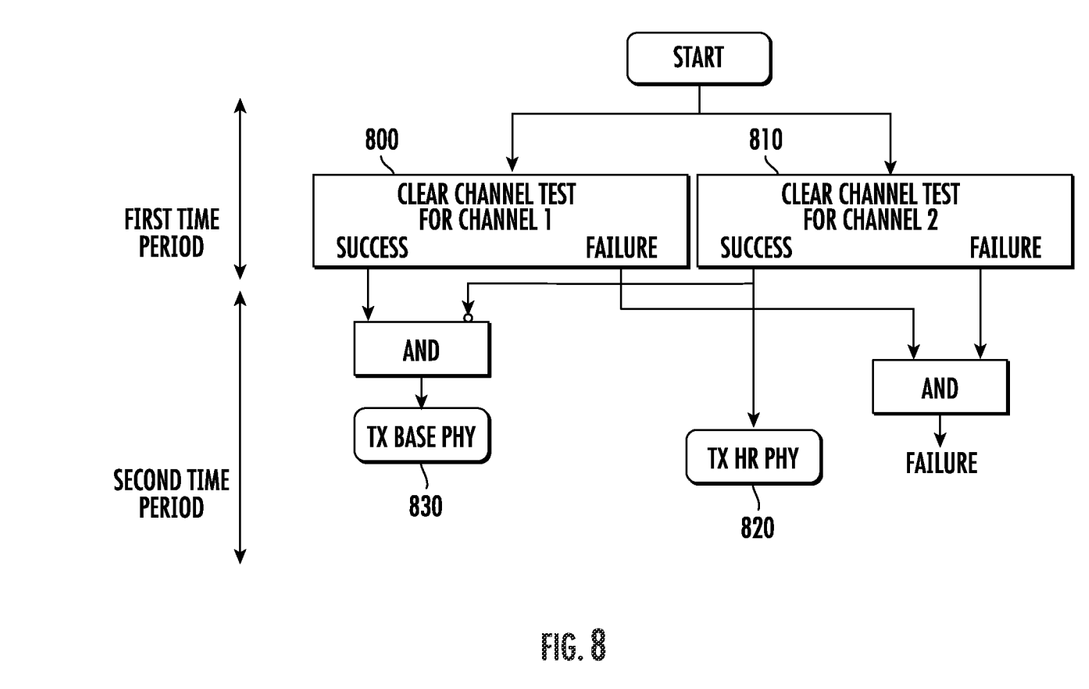
FIG. 8 shows a second sequence that may be utilized with the receiver circuit of FIG. 6.

FIG. 8 shows a different sequence that can be performed using the network device 10 shown in FIG. 6. In this configuration, it is assumed that the receiving node is able to receive packets transmitted using different channels without prior notification of which channel is to be used. An example of such receiver was disclosed in U.S. Patent Application Publication US20210135692A1. Without needing prior notification of which channel is used, this embodiment eliminates the need for a MODE SWITCH packet. This greatly improves the security of the network as all packets can be encrypted. Also, all packets can contain specific destination address supporting more efficient network traffic.

First, the Channel Access Controller 100 may configure the first and second CCA blocks with the channel setting 57 for the first channel and second channel, respectively.

As shown in Box 800, the clear channel test for channel 1 may commence. This may be at the same time as the clear channel test for channel 2, as shown in Box 810. As described above, the clear channel test for channel 1 either returns CCA1 Failure or CCA1 Success. Simultaneously, the clear channel test for channel 2 either returns CCA2 Failure or CCA2 Success.

One of the two channels may be the preferred channel. For example, channel 2 may utilize a different PHY mode having a higher bit rate. Note that the preferred PHY mode may be selected based on other criteria, such as transmission range, Signal to Noise Ratio (SNR), link budget, or other criteria. In this scenario, channel 2 is a higher rate (HR) and may be preferred. Channel 1 may be considered the base PHY. In this example, it is assumed that Channel 2 is a higher rate channel and is therefore the preferred PHY mode.

Therefore, if the clear channel test for channel 2 succeeds, the protocol processor 110 may provide an enable signal to the transmit circuit 38, along with the PHY mode to be used, which is the higher rate (HR) PHY mode, as shown in Box 820. If, however, the clear channel test for channel 2 fails, but the clear channel test for channel 1 succeeds, the protocol processor 110 may provide an enable signal to the transmit circuit 38, along with the PHY mode to be used, which is the base PHY mode, as shown in Box 830. In this way the packet transmission does not have to be delayed until a subsequent retry.

If both clear channel tests fail, the operation may be considered failed. Although not shown, retries may be introduced into the sequence shown in FIG. 8. For example, if the clear channel test for both channels fails, the sequence may include steps to adjust the delays for both channels and retry the clear channel test until the delays exceed a threshold. The sequence shown in FIG. 8 may be controlled by the Channel Access Controller 100 or the Protocol Processor 110 or a combination thereof.

FIG. 8 shows a sequence using concurrent performance of the clear channel tests. Those of ordinary skill in the art would recognize that the clear channel tests may also be performed sequentially using a single CCA block. For example, the clear channel test for the preferred PHY mode may be performed first. This is done by configuring the channel filter center frequency and bandwidth to the channel dedicated to the preferred PHY mode, enable the receiver and wait for the result. If the first clear channel test succeeds, the packet may be transmitted using the preferred PHY mode. If the first clear channel test fails, a second clear channel test may be performed by configuring the channel filter center frequency and bandwidth to the channel dedicated for the base PHY mode, enable the receiver and wait for the clear channel test result. If the second clear channel test succeeds, the packet may be transmitted using the base PHY. If the second clear channel test also fails, the Channel Access Controller 100 may either terminate or retry, with or without adjusted back-off delay. Other variants of this sequence may be used as well.

Note that the above description suggests that the different channels are associated with different PHY modes. However, other embodiments are also possible. For example, a wireless network protocol may utilize a single PHY mode with a plurality of frequency ranges. For example, the receive circuit of FIG. 6, which includes multiple CCA blocks 60, may be utilized to simultaneously check multiple frequency channels. The network device 10 may then select a channel that returned a channel clear indication.

In another embodiment, the Channel Access Controller 100 may have access to the output of the RSSI detector 58 in each CCA block 60. In this embodiment, the Channel Access Controller 100 may select the channel with the lowest energy and use this channel to transmit the outgoing packet.

The present system and method has many advantages. As described above, in current systems where different PHY modes are used, traditional network devices check the first channel. When it is clear, the network device transmits the MODE SWITCH packet. The network device then checks the second channel. When the second channel is clear, the second packet using the new PHY mode is transmitted. However, there are issues wherein the second channel may remain busy such that the network device cannot send the second packet. This causes the network device to abort to sequence, but the receiving node may still be awaiting a packet using the second PHY mode. By checking both channels before transmitting the MODE SWITCH packet, the probability that the second packet is not transmitted is greatly reduced. This improves throughput and reduces wanted power consumption.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

Accordingly, the claims set forth below should be construed in view of the full breadth and spirit of the present disclosure as described herein.

What is claimed is:

1. A network device for transmitting packets using a plurality of channels, comprising:
   a transceiver comprising:
   a receiver circuit comprising at least one Clear Channel Assessment (CCA) block to determine whether a channel is clear;
   a transmit circuit adapted to transmit packets on any of the plurality of channels; and
   a channel access controller, wherein the channel access controller controls the receiver circuit to perform clear channel tests of at least two of the plurality of channels during a first time period, and controls the transmit circuit to transmit at least one packet on a clear channel during a second time period, after the first time period, wherein the receiver circuit comprises a channel filter having a programmable frequency and bandwidth, and wherein the channel access controller configures the channel filter for a first channel, waits for completion of a first clear channel test, configures the channel filter for a second channel and waits for completion of a second clear channel test before transmitting the at least one packet.

2. The network device of claim 1, wherein the clear channel tests are performed sequentially during the first time period and the network device transmits at least two packets during the second time period using two different clear channels.

3. The network device of claim 2, wherein a first packet comprises a MODE SWITCH packet sent using a first PHY mode and a second packet comprises a packet using a second PHY mode.

4. The network device of claim 1, wherein each failed clear channel test is followed by an adjustment in back-off delay and a retry, wherein the back-off delay represents time between a completion of a failed clear channel test and a start of a clear channel test retry.

5. The network device of claim 1, wherein the receiver circuit comprises a local oscillator, and wherein the channel access controller configures the bandwidth of the channel filter and the local oscillator to tune a receive frequency to a first channel, waits for completion of a first clear channel test, configures the bandwidth of the channel filter and the local oscillator to tune the receive frequency to a second channel and waits for completion of a second clear channel test before transmitting the at least one packet on the clear channel.

6. The network device of claim 1, wherein each of the plurality of channels utilizes a different PHY mode.

7. A network device for transmitting packets using a plurality of different channels, comprising:
   a transceiver comprising:
   a receiver circuit comprising a plurality of Clear Channel Assessment (CCA) blocks, configured to operate concurrently;
   a transmit circuit, adapted to transmit packets on any of the plurality of different channels; and
   a channel access controller, wherein the channel access controller controls the receiver circuit to perform clear channel assessments on at least two of the plurality of different channels during a first time period, and controls the transmit circuit to transmit at least one packet on a clear channel during a second time period, after the first time period, wherein each CCA block comprises a channel filter having a programmable frequency and bandwidth, wherein the channel access controller processes the CCA blocks concurrently such that the channel access controller configures a first channel filter for a first channel, configures a second channel filter for a second channel, enables the receiver circuit and waits for a clear channel assessment to complete before transmitting the at least one packet.

8. The network device of claim 7, wherein the network device transmits at least two packets during the second time period, wherein the at least two packets are transmitted using two different channels.

9. The network device of claim 8, wherein a first packet comprises a MODE SWITCH packet sent using a first PHY mode and a second packet comprises a packet using a second PHY mode.

10. The network device of claim 7, wherein the channel access controller configures the plurality of channel filters before performing the clear channel assessments.

11. The network device of claim 7, wherein each of the plurality of different channels utilizes a different PHY mode.

12. The network device of claim 7, wherein the first channel is a preferred channel using a preferred PHY and the second channel is a base channel using a base PHY, wherein the channel access controller configures the transmit circuit to transmit the preferred PHY on the preferred channel if a first clear channel test succeeded and configures the transmit circuit to transmit the base PHY on the base channel if the first clear channel test failed and a second clear channel test succeeded.

13. A network device for transmitting packets using a plurality of channels, comprising:
    a transceiver comprising:
    a receiver circuit comprising at least one Clear Channel Assessment (CCA) block to determine whether a channel is clear;
    a transmit circuit adapted to transmit packets on any of the plurality of channels; and
    a channel access controller, wherein the channel access controller controls the receiver circuit to perform clear channel tests of at least two of the plurality of channels during a first time period, and controls the transmit circuit to transmit at least one packet on a clear channel during a second time period, after the first time period, wherein the CCA block comprises a channel filter having a programmable frequency and bandwidth, and wherein the channel access controller configures the channel filter such that the bandwidth of the channel filter encompasses a combined frequency range of the at least two of the plurality of channels.

14. The network device of claim 13, wherein the network device transmits at least two packets during the second time period, wherein the at least two packets are transmitted using two different channels.

15. The network device of claim 14, wherein a first packet comprises a MODE SWITCH packet sent using a first PHY mode and a second packet comprises a packet using a second PHY mode.

16. The network device of claim 13, wherein each of the at least two of the plurality of channels utilizes a different PHY mode.

17. The network device of claim 1, wherein the first channel is a preferred channel using a preferred PHY and the second channel is a base channel using a base PHY, wherein the channel access controller configures the transmit circuit to transmit the preferred PHY on the preferred channel if the first clear channel test succeeded and configures the transmit circuit to transmit the base PHY on the base channel if the first clear channel test failed and the second clear channel test succeeded.

* * * * *